Sept. 26, 1933.  P. L. LOBEZ ET AL  1,927,942
AUTOMOTIVE BRAKE
Filed Sept. 12, 1929
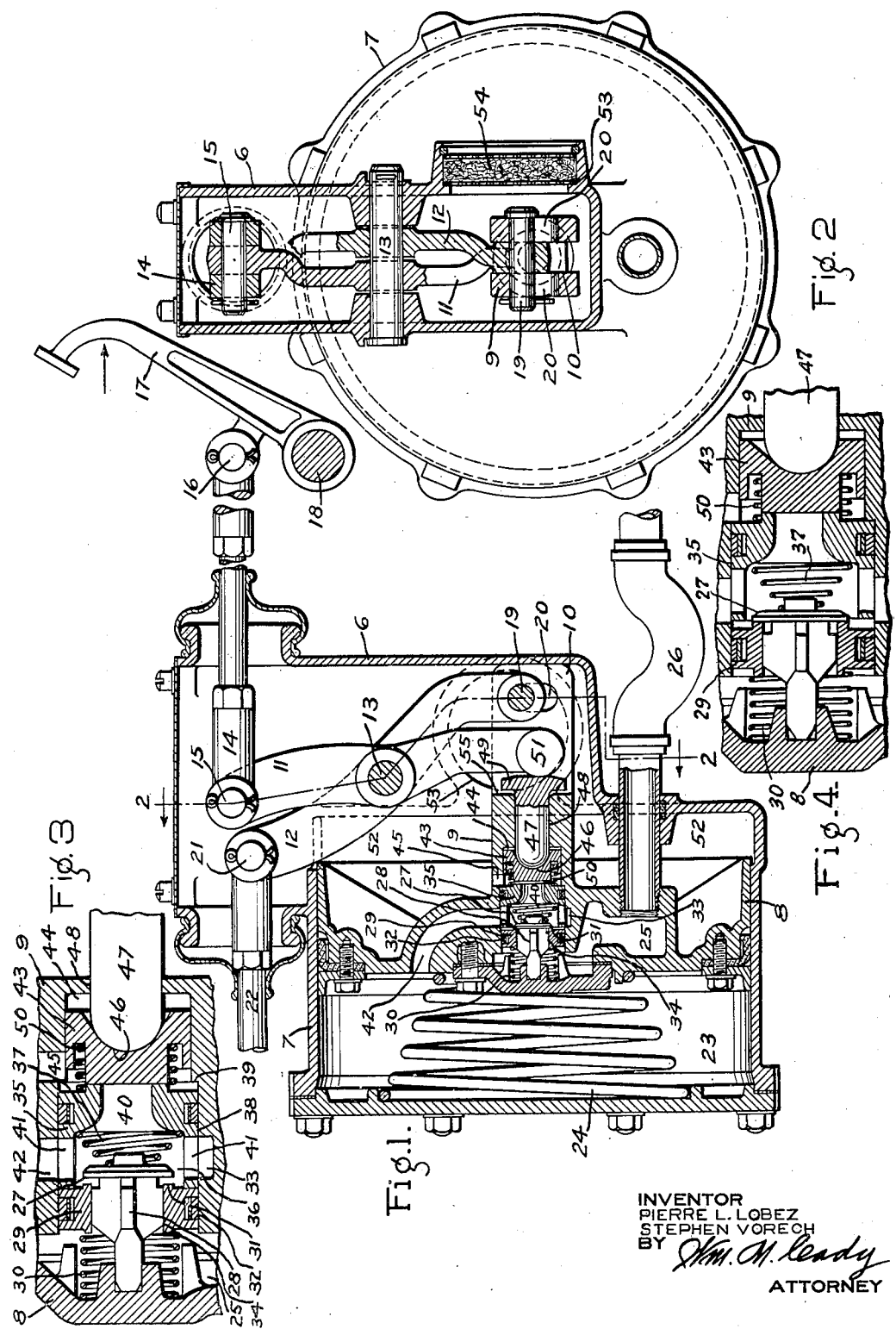
INVENTOR
PIERRE L. LOBEZ
STEPHEN VORECH
BY
ATTORNEY Patented Sept. 26, 1933

1,927,942

UNITED STATES PATENT OFFICE 1,927,942

AUTOMOTIVE BRAKE

Pierre L. Lobez, Wilkinsburg, and Stephen Vorech, Wilmerding, Pa., assignors to The Westinghouse Air Brake Company, Wilmerding, Pa., a corporation of Pennsylvania Application September 12, 1929
Serial No. 392,118

2 Claims. (Cl. 188—152)

This invention relates to brakes, and more particularly to automotive brakes of the type in which the brakes are controlled by mechanism actuated by the partial vacuum created by the suction of the engine.

Heretofore, in devices of this character the valve mechanism for controlling the piston chamber has been located at a point on the casing in proximity to said chamber, and such valve mechanism has been actuated by means connected to the vehicle brake mechanism. The brake mechanism has been so arranged, that movement of the piston amplifies the movement of the brake mechanism and in this way the power applied to the brakes is increased.

An object of the present invention is to provide a brake apparatus of the above type in which the entire braking force is obtained by a vacuum operated piston.

Another object of the invention is to provide a vacuum operated brake apparatus in which the valve means is mounted in the piston.

Another object of the invention is to provide an improved automotive brake of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, Figure 1 is a vertical longitudinal section of an automotive brake embodying the invention, showing the same in release position; Fig. 2 is a vertical transverse section taken on the line 2—2 of Fig. 1; Fig. 3 is an enlarged section of the valve mechanism, showing the same in brake applying position; and Fig. 4 is an enlarged section of the valve mechanism, showing the same in release position, as in Fig. 1.

Referring to the drawing, the device may comprise a casing 6 for enclosing the several parts of the mechanism, and formed as an integral part of the casing, is a cylinder 7 containing a movable abutment or power means, which may be in the form of a piston 8.

Projecting from one side of the piston 8 and axially disposed thereto, is a stem 9, the free end of which is vertically slotted, or recessed, as indicated at 10.

Two levers, 11 and 12, are pivotally mounted within the casing 6, said levers being carried on a common pivot pin 13 which is journalled in the side walls of the casing, as shown best in Fig. 2.

The lower end of the lever 11 is disposed within the slotted end portion 10 of the piston stem 9, and the upper end of said lever is connected to a rod 14 by means of a pin 15. The other end of the rod 14 is pivotally connected by a pin 16, to the brake pedal lever 17 of the vehicle, said pedal lever being fulcrumed on a shaft 18, in the usual well know manner.

The lower end of the lever 12 is connected to the free end of the piston stem 9 by means of a pin 19 which is mounted in vertically disposed elongated openings 20 formed in the piston stem. The upper end of the lever 12 is connected by means of a pin 21 to a rod 22 connected to the braking element or elements (not shown) of the vehicle.

Contained in a chamber 23 of the cylinder 7, is an expansible coil spring 24, which normally forces the piston 8 outwardly of the cylinder 7 so that the free end of the piston stem 9 engages the end wall of the casing 6.

The piston 8 is formed with a chamber 25 which is connected by a pipe 26 to the intake manifold (not shown) of an internal combustion engine.

In the present instance, the valve mechanism for controlling the communication from chamber 23 to chamber 25, and also the communication from chamber 23 to chamber 52 on the opposite side of the piston 8, is mounted in the piston and its stem.

As shown, the valve mechanism may comprise a valve 27, the stem 28 of which engages in a recess in the head of the piston.

Associated with the valve 27, is a piston 29 which is mounted in a chamber 32 formed in the piston 8 between the chamber 25 and a chamber 33. On one side the piston 29 is subject to the pressure of a spring 30, and on the opposite side this piston has a seat rib 31 against which the valve 27 is adapted to seal. A central bore or opening 34 is formed axially through the piston 29, and the stem 28 of the valve 27 extends through this opening so that the piston can move relatively to the valve 27. When the seat rib 31 of the piston 29 engages the valve 27, communication through the piston is cut off.

Mounted in front of the piston 29 is a second piston 35, which is contained in a chamber 38 coextensive with the piston chamber 32. The outer end of the chamber 38 is formed with a shoulder 39 which provides a stop for limiting the outward movement of the piston 35.

The side of the piston 35 which faces the valve 27 is formed with a recess 36, in which is contained an expansible coil spring 37 which bears at one side against the valve 27 and at the other side against the piston 35.

The stem 28 of valve 27 being slidably mounted and bottoming in a recess in the piston 8, it will be seen that when the piston 29 is moved relatively of, and toward the piston 8, the valve 27 will be prevented from moving with the piston 29 by the engagement of the stem 28 with the bottom of the recess in piston 8, so that said valve will be unseated from its valve seat on piston 29. The spring 37 urges the valve 27 to its seat on the piston 29, when the piston 29 moves from the position shown in Fig. 3 to the position shown in Figs. 1 and 4.

A central longitudinal opening 40 is formed in the piston 35 so as to provide a communication through the piston, and the skirt of the piston is perforated, as at 41, so as to provide a communication from the interior of the piston to the chamber 33 and also to a passage 42 leading from the chamber 33 to the chamber 23.

Associated with the piston 35, is a third piston 43 which is mounted in a chamber 44 formed in the stem 9. Chamber 44 is in communication with the interior of the casing 6 through a port 45.

On its outside, piston 43 is formed with a recess 46 for the reception of the inner end of a plunger 47 mounted in a bore 48 formed longitudinally in the stem, the outer end of the plunger being enlarged to provide a head 49. This head is larger than the size of the bore 48 so as to limit the inward movement of the plunger 47.

Interposed between the pistons 35 and 43 is an expansible coil spring 50, which normally forces the piston 43 away from the piston 35, and in so doing the plunger is forced outwardly of the stem 9 so that its head 49 engages the enlarged end 51 of the lever 11.

Pistons 35 and 43 together constitute a valve for controlling the communication from the opening 40 in the piston 35 through the opening 45 in the piston stem 9, and therefore, the communication provided from chamber 23 through piston 8 to chamber 52 in the casing, which chamber is open to the atmosphere through an opening 53 provided with a suitable air filtering medium 54, as shown in Fig. 2.

Referring now to Fig. 1, with the piston 43 normally separated from the piston 35, the spring 37 will maintain the piston 35 in its outer position in the chamber 38, with the outer face of said piston abutting the shoulder 39. In this position the inner edge of the piston 35 will be separated from the outer face of the piston 29 and the spring 30 acts on the piston 29 so that the seat rib 31 seals against the valve 27.

Therefore, in the normal or inoperative position of the valve mechanism of the device, communication is cut off from the chamber 25 to the chamber 33, through the opening 34, and communication is established from chamber 23 to chamber 52, through passage 42, openings 41, recess 36, opening 40, the space between the adjacent faces of pistons 35 and 43, and port 45.

With the communication from chamber 25 to chamber 33, thus normally closed, and the communication from piston chamber 23 to the atmospheric chamber 52 open, chamber 23 will be at atmospheric pressure, and since the pressures on both sides of the piston 8 are equal, the piston 8 will be maintained in its normal inoperative position in the right hand portion of the cylinder 7 by the spring 24, as shown in Fig. 1.

When it is desired to apply the brakes, the operator depresses the brake pedal lever 17 in the direction indicated by the arrow, Fig. 1. This action is transmitted to the lever 11, through the rod 14, and the lower end 51 of said lever is moved toward the left thereby imparting a corresponding movement of the plunger 47.

The plunger 47 will now move the piston 43 toward the left, until the inner face of said piston abuts the adjacent face of the piston 35, thereby closing the gap between the pistons 35 and 43, and consequently cutting off the communication from chamber 23 to chamber 52.

With the piston 43 now abutting piston 35, further inward movement of the plunger 47 will cause both of these pistons to move inwardly of the piston stem 9, and in this action the inner edge of the skirt of piston 35 engages the outer face of the piston 29, so that the latter piston is also moved inwardly.

Since the valve 27 is held against movement by the piston 8, when the piston 29 is moved inwardly in the manner just described, the seat rib 31 will be disengaged from the adjacent face of the valve 27, thereby establishing the communication from chamber 25 to the chamber 23, through opening 34, chamber 33 and passage 42, as shown in Fig. 3. This connects the chamber 23 with the engine suction, and consequently a partial vacuum will be created in the chamber 23 so that piston 8 is caused to move inwardly of said chamber by the greater force of the fluid pressure in chamber 52. The movement of the piston 8 to the left is transmitted through the lever 12 to the brake rod 22, and the latter is actuated to apply the brakes (not shown).

The inward movement of the plunger 47, and, consequently, the inward movement of the pistons 27, 35 and 43 with respect to the piston 8, will be arrested when the head 49 of the plunger 47, engages the face 55 on the piston stem 9 at the inner end of the slot 10.

The pressure of the lower end 51 of the lever 11 against the plunger 47 will maintain the pistons 27, 35 and 43 so positioned within the piston 8, and consequently the communication from chamber 25 to chamber 23 will remain open, and the communication from chamber 33 to chamber 52 will remain closed, as long as the operator holds the brake pedal lever 17 depressed an amount sufficient to maintain the plunger head 49 against the face 55.

If at this time the operator relieves the pressure slightly against the brake pedal lever 17, spring 30 will force the piston 29 outwardly an amount sufficient to seal the seat rib 31 against the valve 27, thereby cutting off the communication from the chamber 25 to the chamber 23, through opening 34, chamber 33 and passage 42. With the source of partial vacuum thus cut off, piston 8 will remain in the position it is then occupying, and the brakes will be held applied.

Should further brake pressure be required, the operator can depress the pedal lever 17 to move plunger 47 inwardly again so as to unseat the piston 29 from the valve 27, thereby reestablishing the communication by which a partial vacuum is created in chamber 23, so that the piston 8 is moved further to the left.

When it is desired to release the brakes the operator relieves the pressure on the brake pedal lever 17 so that said lever can return to its normal inoperative position. Spring 30 will now force the piston 29 outwardly, engaging the seat rib 31 with the valve 27, and thus closing the communication from chamber 23 to chamber 25. Spring 37 will also force the pistons 35 and 43 outwardly until the outer face of piston 35 engages the shoulder 39. Whereupon spring 50 will move the piston 43 outwardly away from the piston 35.

With the adjacent faces of the pistons 35 and 43 thus separated, communication will be established from the atmospheric chamber 52 to the chamber 23 and the latter chamber will be supplied with fluid from the former chamber. Piston 8 is then moved outwardly toward the right until further movement is prevented when the end of the piston stem 9 abuts the end wall of the casing 6. This outward movement of the piston 8 is transmitted through the lever 12 to the brake rod 22 and the latter is moved to release position.

It will be understood that during the operation of the device, should the source of partial vacuum fail from any cause, so as to prevent a partial vacuum being supplied to piston chamber 23 when the valve mechanism is operated to effect the operation of piston 8 in the above described manner, the device can be manually operated to effect an application of the brakes.

In such case, when the operator depresses the pedal lever 17, and the plunger 47 is moved to the left, as has been described, the head 49 of the plunger will engage the face 55 on the piston stem 9 and the force exerted by the operator on the pedal lever 17 is transmitted to the piston 8, so that the piston is manually moved toward the left against the pressure of spring 24. This movement of the piston is then transmitted through the lever 12 to the brake rod 22 as has been previously described, so as to effect an application of the brakes.

While the amount of effort required to manually operate the piston 8 is more than is required to effect the usual application of the brakes the resistance offered by the piston will not be so great as to prevent the operator from effecting an application of the brakes, should the source of partial vacuum fail, since the size of the chamber 23 is relatively large and the travel of the piston 8 therein is relatively small.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake operating member and a piston operatively connected to said member and operable by variations in fluid pressure, of a movable abutment mounted in and movable relatively to said piston, a valve seating on said abutment and controlling a port in said abutment, through which the fluid pressure on one side of said piston is varied, a valve seating on said abutment and controlling a port in said abutment, through which the fluid pressure on one side of said piston is varied, and means for moving one valve to first engage its seat, the further movement of said valve by said means operating to move said abutment relatively to the other valve so that said other valve is unseated.

2. In a fluid pressure brake the combination with a brake operating member and a piston operatively connected to said member and operable by variations in fluid pressure, of a movable abutment mounted in and movable relatively to said piston, a valve seating on said abutment and controlling a port in said abutment, through which the fluid pressure on one side of said piston is varied, said valve being held by said piston against movement as said abutment is moved relatively of and toward said piston, a valve seating on said abutment and controlling a port in said abutment, through which the fluid pressure on one side of said piston is varied, and means for moving the last mentioned valve to first engage its seat, the further movement of said valve operating to move said abutment relatively to the other valve so that said other valve is unseated.

PIERRE L. LOBEZ.
STEPHEN VORECH.